US009546486B2

(12) United States Patent
DesJardins, Jr.

(10) Patent No.: US 9,546,486 B2
(45) Date of Patent: Jan. 17, 2017

(54) PATIO EXTRUSION BEAM CAP

(75) Inventor: Dale DesJardins, Jr., Venice, FL (US)

(73) Assignee: Tara L. Desjardins, Venice, FL (US)

( * ) Notice: Subject to any disclaimer, the term of this patent is extended or adjusted under 35 U.S.C. 154(b) by 813 days.

(21) Appl. No.: 13/292,149

(22) Filed: Nov. 9, 2011

(65) Prior Publication Data

US 2012/0110938 A1 May 10, 2012

Related U.S. Application Data

(60) Provisional application No. 61/411,544, filed on Nov. 9, 2010.

(51) Int. Cl.

*E04F 19/02* (2006.01)
*E06B 9/54* (2006.01)
*E06B 9/52* (2006.01)
*F16B 5/06* (2006.01)
*E04H 17/00* (2006.01)

(52) U.S. Cl.

CPC ................. *E04F 19/02* (2013.01); *E06B 9/52* (2013.01); *E06B 9/521* (2013.01); *E06B 9/54* (2013.01); *E04H 2017/006* (2013.01); *F16B 5/0692* (2013.01)

(58) Field of Classification Search

CPC .............. E06B 9/52; E06B 9/54; E06B 9/521; E06B 2009/527; E04H 2017/006; F16B 5/0692

USPC ............. 52/202, 203, 63, 588.1, 177, 483.1, 312,52/287.1, 844; 160/380, 395, 371, 382, 391, 160/393, 396, 399, 403, 266

See application file for complete search history.

(56) References Cited

U.S. PATENT DOCUMENTS 3,143,165 A * 8/1964 Lewis et al. .................. 160/394
3,220,469 A * 11/1965 Oehmig .................... E06B 9/52 160/380
3,761,603 A * 9/1973 Hays ...................... H02G 3/045 138/157
3,909,994 A * 10/1975 Richter ............................ 52/63
4,084,360 A 4/1978 Reckson
4,231,141 A * 11/1980 Derrick et al. ................. 24/462
4,274,234 A * 6/1981 Abell .................. A01G 9/1415 52/222
4,410,027 A * 10/1983 Lucous ......................... 160/380
4,566,236 A * 1/1986 Pound ............................ 52/222
4,640,314 A * 2/1987 Mock .................. H02G 3/0418 138/157
4,665,670 A * 5/1987 van den Burg ................. 52/222
4,690,192 A * 9/1987 Stilling ........................... 160/57

(Continued)

*Primary Examiner* — Babajide Demuren

(74) *Attorney, Agent, or Firm* — Dinsmore & Shohl LLP; Douglas J. McEvoy

(57) ABSTRACT

The present invention discloses a beam cap incorporated into a patio extrusion assembly and which includes an elongated body exhibiting, in cross section, a width extending middle portion terminating at opposite ends in engaging tabs. The body is affixed to an exposed profile associated with a component of the extrusion assembly. Additional features include the middle portion exhibiting an arcuate configuration, with the engaging tabs further including a first pair of inner tabs each exhibiting an outwardly angled detent deflected and reseated in a resistive snap-fit fashion with aligning end channels associated with the exposed profile. The engaging tabs further include a second pair of outer tabs within which the end channels seat. Other features include the beam cap exhibiting a specified shape and size and being constructed of an extruded aluminum or least one of vinyl or PVC.

4 Claims, 2 Drawing Sheets

(56) References Cited

U.S. PATENT DOCUMENTS

| | | | | |
|---|---|---|---|---|
| 4,860,778 | A * | 8/1989 | Pohl | 135/97 |
| 4,865,066 | A * | 9/1989 | Brooks | 135/121 |
| 4,899,797 | A * | 2/1990 | Green | 160/395 |
| 4,907,767 | A * | 3/1990 | Corsi | H02G 3/0437 138/162 |
| 4,947,561 | A * | 8/1990 | Delacroix et al. | 38/102.91 |
| 5,046,546 | A * | 9/1991 | Benedyk | E06B 9/521 160/371 |
| 5,134,250 | A * | 7/1992 | Caveney | H02G 3/0418 138/162 |
| 5,224,306 | A * | 7/1993 | Cramer | 52/63 |
| 5,242,004 | A * | 9/1993 | Stilling | 160/57 |
| 5,906,078 | A * | 5/1999 | Cramer | 52/222 |
| 5,942,729 | A * | 8/1999 | Carlson, Jr. | H02G 3/0418 174/66 |
| 6,263,949 | B1 * | 7/2001 | Guthrie, Jr. | 160/380 |
| 6,284,974 | B1 * | 9/2001 | Albert | H02G 3/0418 174/68.3 |
| 6,318,036 | B1 | 11/2001 | Siudzinski et al. | |
| 6,903,265 | B1 * | 6/2005 | VanderVelde | H02G 3/0418 174/481 |
| 7,615,710 | B2 * | 11/2009 | Sayres | H02G 3/0418 174/480 |
| D608,912 | S * | 1/2010 | Betty | D25/121 |
| 7,748,194 | B2 | 7/2010 | Carless | |
| 7,829,797 | B2 * | 11/2010 | VanderVelde | H02G 3/0418 174/481 |
| 8,141,569 | B2 * | 3/2012 | Turner | B60S 3/04 134/123 |

* cited by examiner

PATIO EXTRUSION BEAM CAP

CROSS-REFERENCE TO RELATED APPLICATIONS

This Application claims the benefit of U.S. Provisional Application 61/411,544 filed on Nov. 9, 2010.

FIELD OF THE INVENTION

The present invention relates generally to a patio extrusion assembly for supporting a screen. More specifically, the invention discloses an elongated beam cap designed for seating within a recessed channel associated with such as an inwardly facing surface of a supporting spline groove and which covers the heads of the end installed screws in order to both retard corrosion of the same and to provide an overall sleeker appearance.

BACKGROUND OF THE INVENTION

The prior art is documented with examples of extruded and other types of plastics in use with framing members. One example is that depicted in U.S. Pat. No. 6,318,036 to Siudzinski et al. and which discloses the incorporation of sections of extruded rigid plastic material incorporated into an improved patio door assembly and forming a rectangular main frame and associated swinging door panel frames. The frames include a pair of vertical jamb members, a top head member and a bottom sill member connected by welded mitered corners and in use prevent warping or sagging.

U.S. Pat. No. 7,748,194, to Carless, teaches a closure frame corner joint incorporated into a building closure assembly such as a patio door butt joint. U.S. Pat. No. 4,084,360 to Reckson teaches an extruded building device exhibiting spline groove configured for reception of either a flat or round spline for retention of fiberglass or other type of screen material within the spline groove, such as further incorporated into a screen door and patio screen sections.

SUMMARY OF THE INVENTION

The present invention discloses a beam cap incorporated into a patio extrusion assembly and which includes an elongated body exhibiting, in cross section, a width extending middle portion terminating at opposite ends in engaging tabs. The body is affixed to an exposed profile associated with a component of the extrusion assembly.

Additional features include the middle portion exhibiting an arcuate configuration, with the engaging tabs further including a first pair of inner tabs each exhibiting an outwardly angled detent deflected and reseated in a resistive snap-fit fashion with aligning end channels associated with the exposed profile. The engaging tabs further include a second pair of outer tabs within which the end channels seat. Other features include the beam cap exhibiting a specified shape and size and being constructed of an extruded aluminum or least one of vinyl or PVC.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As will be described in detail below, the present invention discloses an elongated beam covering cap for use with a patio extrusion assembly. As further previously described, the beam cap is designed for seating within a recessed channel or other suitable exposed profile associated with such as an inwardly facing end surface of a spline groove component providing cross support to the screen, and in such a fashion that the beam cap covers the exposed profile and as well as the heads of end installed screws, this in order to both retard corrosion of the same and to provide an overall sleeker appearance.

Figure 1:
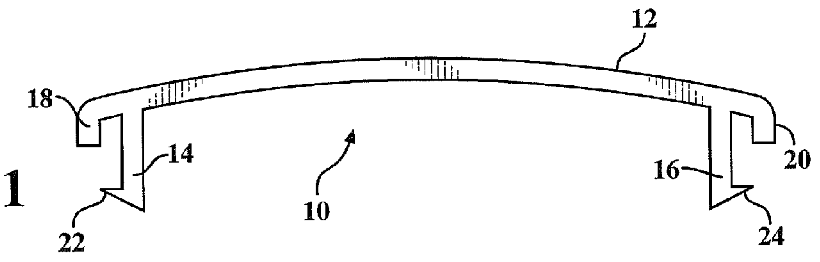
FIG. 1 is a cross section cutaway of a beam cap and illustrating its opposite edge extending profile for seating within the end channel configuration associated with the supporting spline groove.

Referring initially to FIG. 1, illustrated is a cross section cutaway of a beam cap 10 which can possess any desired width, length and thickness dimensions. The cap 10 as shown in cross section exhibits a generally elongated and, typically, arcuate middle portion 12 which terminates at opposite ends in pairs of spatially arrayed and depth offset engaging tabs, see inner tabs 14 & 16 and outer tabs 18 & 20.

Inner tabs 14 and 16 each exhibit an outwardly angled detent, see at 22 and 24 for tabs 14 and 16, respectively, which extend outwardly from lower projecting ends of the inner tabs 14 and 16 relative to shorter (reduced length) dimensioned outer tabs 18 and 20 relative to said longer inner tabs 14 and 16. In this fashion, the inner tabs 14 and 16 are (inwardly) deflected and reseated (in part due to the gripping forces exerted by the outwardly angled detents 22 and 24) in a resistive snap-fit fashion with inner surfaces of aligning and forward end projecting walls 26 and 28 of a supporting spline groove 30 (see FIG. 3) associated with the patio extrusion. Concurrently, outer corner edges of the projecting end walls 26 and 28 seat inside of the outer tabs 18 and 20 which cover there-over in order to provide a neat and flush appearance as shown.

The beam cap 10 can be constructed of any material including such as an aluminum extrusion. Additional material considerations for the beam cap 10 may also include extruding, molding or otherwise forming out of additional materials not limited to a vinyl or PVC (polyvinyl chloride). Beyond those materials identified, it is also understood that additional variants of the beam cap 10 can be constructed of any material exhibiting the necessary properties of durability and resilience and including other metals, composite ceramics and synthetic materials further including any form of composite plastic or polymer.

Figure 2:
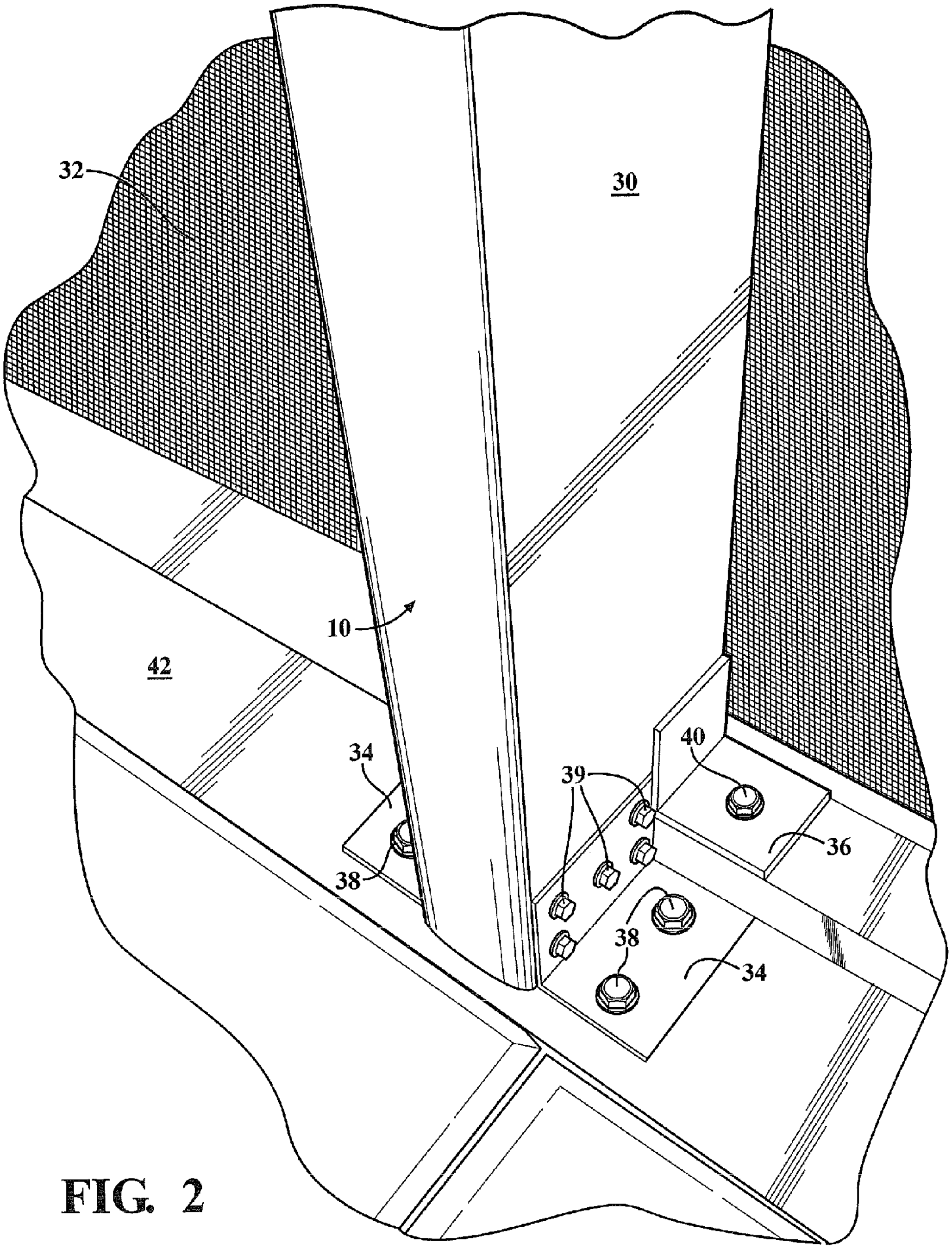
FIG. 2 is a perspective view of the screen supporting extrusion spline groove with the beam cap affixed in place.

FIG. 2 is a perspective view of the screen supporting extrusion spline groove, see again as depicted at 30, with the beam cap 10 affixed in place. Further illustrated at 32 is a portion of a screen which is supported at a forward end of the spline groove 30. Although not clearly shown, it is contemplated that screen can be provide as one or more individual components and which can further be fixed or traversable as desired. Also depicted are a series of bottom edge angle supporting brackets 34 and 36 and corresponding fasteners 38, 39 and 40 for anchoring the spline groove 30 to a lower sill or threshold 42 proximate to the location of the screen 32. Although not shown, an identical set of brackets and fasteners can be provided for anchoring the top of the spline groove 30 to a corresponding top header associated with the assembly.

Figure 3:
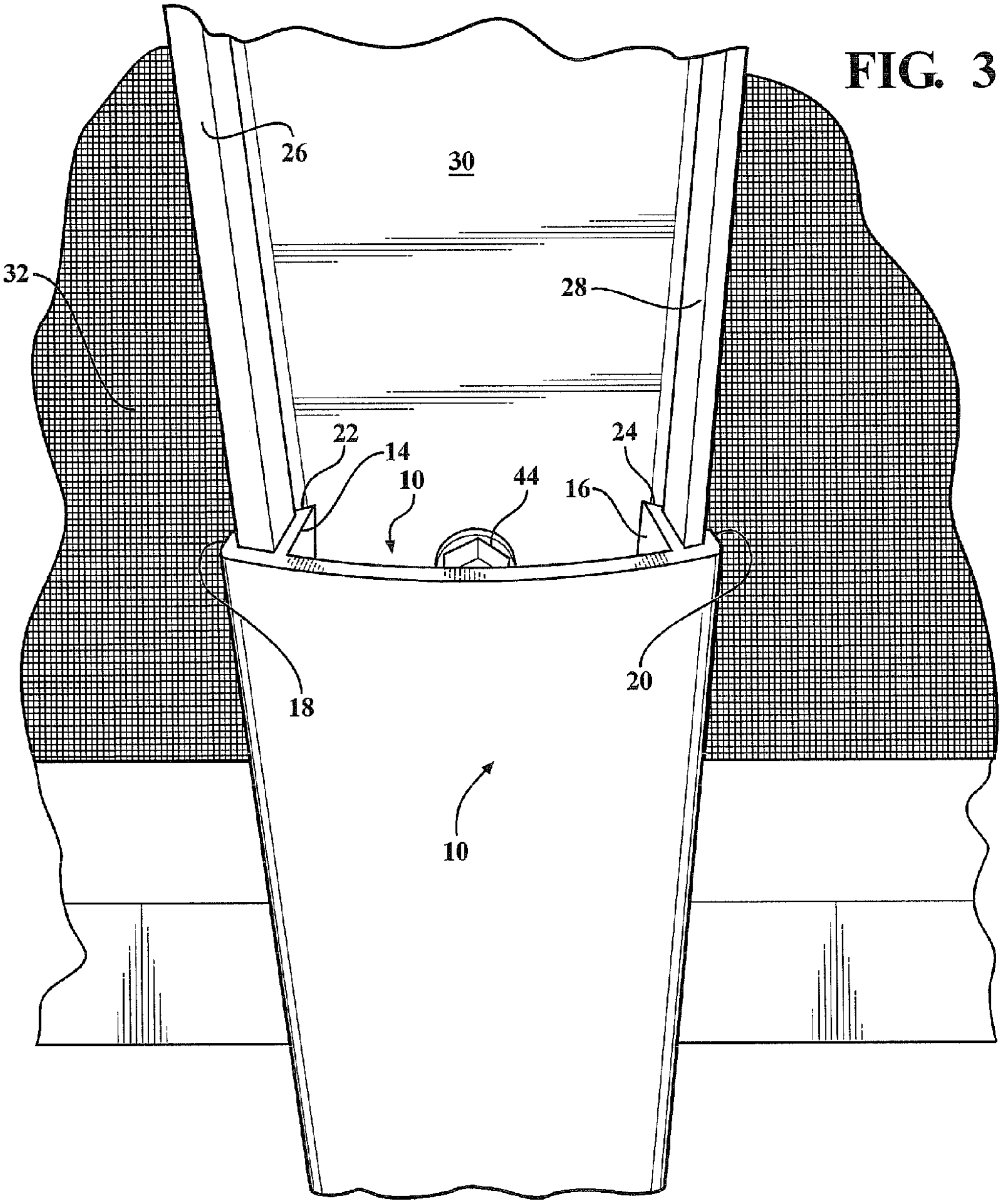
FIG. 3 is a plan view of a reduced length beam cap positioned for installation within a spline groove and better showing the manner in which it covers the exposed screw heads of the end installed fasteners.

Finally, and referring to FIG. 3, a plan view is illustrated of a reduced length beam cap 10 positioned for installation within an end face of the spline groove 30 and depicting the manner in which the beam cap illustrated in reduced length profile covers the corresponding end surface of the spline groove 30 shown by forward projecting end walls 26 and 28. In this manner, the beam cap 10 covers exposed screw heads, such as depicted at 44, and which are associated with end installed fasteners of the spline groove.

It is further envisioned that the beam cap 10 can be reconfigured or otherwise reshaped, as well as the pairs of engagement tabs possibly reconfigured, in order to engage any suitably configured end channel or profile not limited to the spline groove portion depicted in the illustrated embodiment. It is further understood that the beam cap 10 can be reconfigured and/or re-dimensioned for end face engagement over any suitably configured framing support member, not limited to the spline groove 30 or any other specific extrusion, and can be substituted by other suitably configured and dimensioned components not limited to a patio extrusion as defined herein.

Having described my invention, other and additional preferred embodiments will become apparent to those skilled in the art to which it pertains, and without deviating from the scope of the appended claims.

I claim:

1. A combination beam cap and patio extrusion member, comprising:

said extrusion member having a first elongated body with a rectangular cross sectional shape, said extrusion member extending from a floor location forward relative to a rearwardly supported and cross direction extending screen, said extrusion member including a forward end face having a pair of forward projecting walls extending in a height-wise direction and defining opposite edges of said vertically extending end face, inside corner locations of said projecting walls contacting said end face and each exhibiting a notched recess;

said beam cap including a second elongated body covering said exposed end face of said patio extrusion ion member such that said beam cap does not contact the screen; the beam cap exhibiting, in cross section, a width extending middle portion terminating at opposite ends in engaging tabs;

said engaging tabs further including a first pair of inner tabs each exhibiting an opposite and outwardly angled detent exhibiting a pointed edge, said inner tabs being deflected inwardly and said pointed edges of said detents seating in resistive snap-fit fashion within said inside corner locations of said projecting walls proximate said vertically extending end face; and said engaging tabs further including a second pair of outer tabs overlaying exterior corner edges of said forward end projecting walls concurrent with said body being affixed to an exposed end profile associated with said patio extrusion member.

2. The invention as described in claim 1, said middle portion further comprising an arcuate configuration.

3. The invention as described in claim 1, said beam cap exhibiting a specified shape and size and being constructed of an extruded aluminum.

4. The invention as described in claim 1, said beam cap exhibiting a specified shape and size and being constructed of at least one of vinyl or PVC.

* * * * *